Oct. 31, 1950   E. C. SULLIVAN   2,528,253
SEAL BETWEEN BOWLS OF VACUUM TYPE COFFEE MAKERS
Filed Feb. 20, 1948
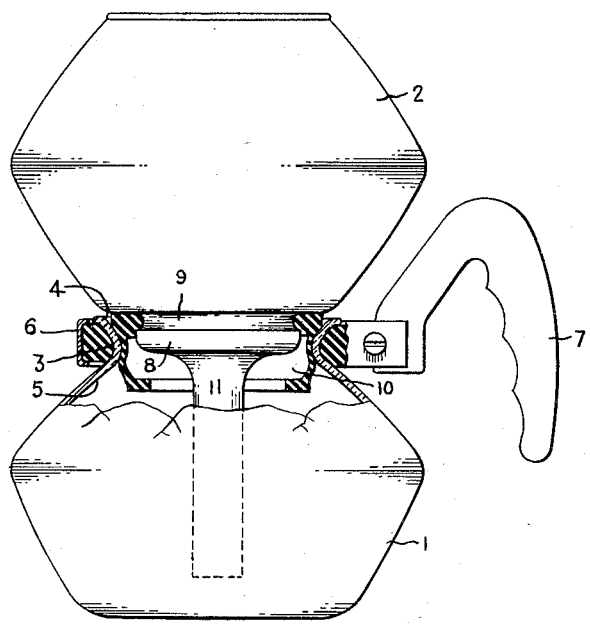
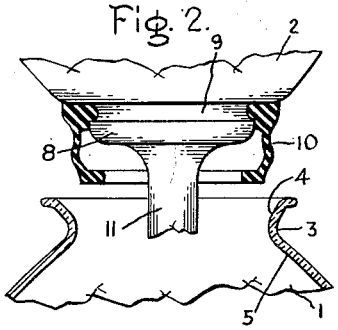
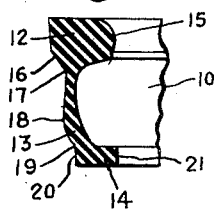
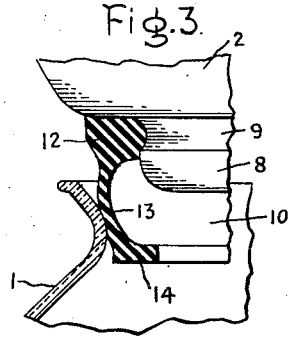
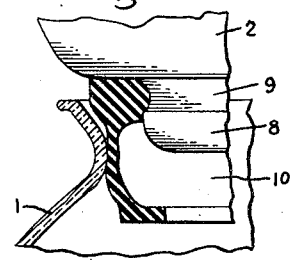
Inventor:
Earle C. Sullivan,
by Alfred V. Robert
His Attorney.

Patented Oct. 31, 1950

2,528,253

UNITED STATES PATENT OFFICE 2,528,253

SEAL BETWEEN BOWLS OF VACUUM TYPE COFFEE MAKERS

Earle C. Sullivan, Bridgeport, Conn., assignor to General Electric Company, a corporation of New York Application February 20, 1948, Serial No. 9,707

4 Claims. (Cl. 99—292)

My invention relates to coffee makers of the character generally known as "vacuum type" coffee makers and has particular application to the sealing or gasket construction used between the upper and lower bowls of such coffee makers.

Some of these devices have lower bowls with small mouths or necks, while others are of the wide-neck type. My invention is designed for use particularly with coffee makers of the wide-neck type.

In known coffee makers, it is often difficult to design a proper seal between the upper and lower bowls, especially when it is desired to break the seal easily after the coffee has been brewed. One object of my invention is to produce an improved seal which at the same time is easy to break when it is desired to remove the upper bowl.

It is customary in some coffee makers to provide an automatic control for the heater which is below the lower bowl, parts of this control cooperating with the base of the tubular stem which extends from the upper bowl. For this reason, and others, it is important that the upper bowl be carefully positioned within the lower bowl so that the automatic controls and the rest of the coffee maker can always function perfectly. Another object of my invention is to provide, in the seal between the upper and lower bowls, a self-centering and guiding action to position the upper bowl and its tubular stem properly within the lower bowl.

Because most of these coffee makers use glassware, at least for the lower bowl, it is often impossible to prevent manufacturing variations in dimension of the bowls. A further object of my invention is to provide an effective seal which will function over a wide range of bowl-size variations, within normal manufacturing tolerances.

The objects of this invention are reached by using a resilient gasket of improved design which has certain dimensions and shapes with relation to portions of the bowls of the coffee maker such that it is easy to apply the upper bowl to the lower bowl and to remove it, the shape of the parts maintaining the proper seal and centering the upper bowl within the lower bowl.

Other objects and the details of that which I believe to be novel and my invention will be clear from the following description and claims taken with the accompanying drawing in which is illustrated an example of coffee maker embodying the present invention and incorporating one form of improved gasket structure.

In the drawing, Fig. 1 is a side view in partial section of a coffee maker according to my invention, showing the upper bowl in the position it will occupy when fully inserted into the lower bowl; Fig. 2 is a partial sectional view showing the neck of the lower bowl and the bottom of the upper bowl in completely detached position, but with the gasket in place upon the upper bowl; Fig. 3 is a partial section on a larger scale showing the two bowls at the beginning of their movement toward each other; Fig. 4 is a similar fragmentary section showing the positions of the bowls and the gasket just before the parts come to rest upon full insertion; and Fig. 5 is a section of the gasket in unstressed condition.

As is understood, the coffee maker comprises a lower bowl 1 and an upper bowl 2 which are used in the coffee brewing operation in the usual manner which will not be described. The lower bowl is shown as having a wide neck 3 with flared walls 4 and 5 immediately above and below the neck. The lower bowl may be provided with the usual handle, shown here as a ring 6 surrounding the neck and a grip 7 which is fastened to the ring in any suitable fashion.

The upper bowl is shown as overhanging the neck of the lower bowl and it has a bottom, shouldered as at 8, and of smaller diameter than the inside of the neck of the lower bowl. This shouldered bottom has an annular groove 9 in which the gasket 10 is seated, as will be more fully described at a later point. Depending from the center of the upper bowl bottom is a tubular stem 11, with functions readily understood in this type of coffee maker.

In order to effect a proper seal between the upper and lower bowls, as well as to center the one within the other, the gasket 10 is provided with three sections which I will call an upper sealing and supporting section 12, a central flexible sealing web section 13, and a lower stiffening section 14. In order to seal the gasket to the upper bowl, an inwardly extending annular shoulder or ridge 15, of the same general shape as the annular groove 9, is provided. Because the gasket as a whole is generally cylindrical in form and made of rubber or other suitable resilient material, it is necessary only that the inside diameter of the ridge 15 be made slightly smaller than the smallest diameter of the groove 9 in order to hold these parts in place when they are forced together.

The top of the section 12 may be left flat to support the bottom of the upper bowl.

Opposite the ridge 15 on the outside of section 12 is an inverted conical face 16 which conforms in general shape and size with the outer flared portion 4 of the neck on the lower bowl. When the two bowls are fully forced together, as shown in Fig. 1, this conical portion 16 will act as a stop or buffer to prevent contact between the overhanging portion of the upper bowl and the flared neck on the lower bowl. The parts occupy this fully compressed position during brewing.

The central section or web 13 of the gasket extends downwardly from the upper section and has walls which taper in thickness from a thin portion near the top of the web to a thicker portion near the bottom of the web. This is shown most clearly in Fig. 5, but should be kept in mind when examining the other figures of the drawings.

The top of the web, immediately below the tapered or conical section and at the point marked 17, is made slightly larger than the smallest expected neck diameter of the lower bowl, when the gasket is in unstressed condition. Below the point 17, the web is swelled outward to its largest diameter at point 18, which is made slightly larger (when unstressed) than the largest expected neck diameter of the lower bowl. At the base of the web, at the point 19, the diameter of the gasket is made slightly smaller than the smallest expected neck diameter of the lower bowl, and the web then merges into a slightly tapered surface 20 which will assist in starting the gasket in its insertion within the neck of the lower bowl. The "largest" and "smallest" expected neck diameters are those which experience has shown will be encountered in the manufacture of bowls of any specified size.

The surface 20 is on the lower stiffening section 14 of the gasket. The stiffness in this portion is obtained by an enlarged inwardly extending annular ridge 21, which, as shown, is entirely free from support by or contact with the tubular stem of the upper bowl.

In operation, the gasket is first slipped onto the groove in the bottom of the upper bowl as explained above and the upper bowl is moved over the lower bowl in the position shown in Fig. 2. The bowl is then lowered, and the tapered sides on the bottom section guide the upper bowl within the neck, the neck compressing the gasket as shown in Fig. 3 as the bowls are pushed together. Further movement of the bowls toward each other will force the point 18 beyond the most constricted portion of the neck and then the gasket will start to pull the bowls towards each other until they reach the position of Fig. 1. The thicker portion at the bottom of the web, as well as the stiffening section, will tend to force and to hold the parts in this position against accidental tilting or withdrawal.

During the pressure cycle of operation of the coffee-maker, the web of the gasket may be forced even more closely into seal with the inside of the neck of the lower bowl, because the web is free from contact with parts of the upper bowl.

If it is desired to remove the upper bowl, all that is necessary is to tilt the upper bowl slightly until the seal between the gasket and the lower bowl has been broken, when the bowls may be separated readily.

It will be seen that my construction provides an easy coaxial alignment of the upper and lower bowls. The large circular sealing areas opposite the ridge 15 and near the point 17 materially stabilize the upper bowl on the lower bowl and prevent rocking. Because the gasket is free from contact with the depending tubular stem and because the bottom of the gasket is tapered, it is easy to insert the gasketed upper bowl within the lower bowl.

Because of the dimensioning of the outside diameters of the cylindrical gasket in relation to the smallest and largest expected neck diameters of the lower bowl, an effective seal always is provided for a wide range of dimensional variations in the bowl.

As will be evident from the foregoing description, certain aspects of my invention are not limited to the particular details of construction of the example illustrated, and I contemplate that various and other modifications and applications of the invention will occur to those skilled in the art. It is therefore my intention that the appended claims shall cover such modifications and applications as do not depart from the true spirit and scope of my invention.

What I claim as new and desire to secure by Letters Patent of the United States is:

1. In a vacuum type coffee maker with a wide-neck lower bowl, the bowl flaring away from the neck above and below immediately adjacent the neck, an upper bowl with an annularly grooved, shouldered bottom and a tubular stem centrally located in the bottom and a seal between the bowls; that improvement in the seal which comprises a generally cylindrical resilient gasket having an inwardly extending annular sealing ridge section at its upper edge, adapted to seat and seal in the groove of the shoulder on the bottom of the upper bowl, an outwardly extending annular projection opposite said ridge with an inverted conical bottom surface corresponding to the flare of the lower bowl neck, a central web section below the upper edge in which the walls of the cylinder taper in thickness downwardly to a thicker bottom portion from a thin portion near said upper ridge section, the outside diameter of said thicker portion being less than the smallest inside diameter of the neck of the lower bowl, and the outside unstressed diameter of the thin top of the web section being greater than the smallest inside diameter of the neck of the lower bowl, an intermediate portion on the web of greater unstressed outside diameter than either the top or bottom of the web, and an inwardly extending annular stiffening ridge section at the bottom edge of the bottom portion of the gasket, the inner surfaces of said stiffening ridge section being substantially greater in diameter than, and entirely unsupported by, the tubular stem in the bottom of the upper bowl.

2. In a vacuum type coffee maker of the type having a lower bowl, a wide neck on the lower bowl, an upper bowl with an annularly grooved bottom and a tube centrally located in the bottom and a seal between the bowls; that improvement in the seal which comprises a generally cylindrical resilient gasket having an inwardly extending enlarged annular sealing ridge section at its upper edge, adapted to seat and seal in the groove on the bottom of the upper bowl, a web section below the ridge section in which the walls of the cylinder taper in thickness downwardly to a thicker bottom portion from a thin portion near said ridge section, the outside diameter of said thicker portion being less than the smallest inside diameter of the neck of the lower bowl, and the outside unstressed diameter of the thin top portion of the web section next to the ridge section being greater than the smallest inside diameter of the neck of the lower bowl, an intermediate portion on said web of greater outside unstressed diameter than either the top or bottom portions of the web, and an inwardly extending enlarged annular stiffening ridge section at the bottom edge of the web section, the inner surfaces of said stiffening ridge section being free from contact with the parts of the upper bowl, and the outer surfaces of said stiffening ridge being tapered to facilitate insertion of the gasket into the neck of the lower bowl.

3. As an article of manufacture, a gasket for a coffee maker of the type having an upper bowl with a depending tubular stem and a lower bowl with a flared wide neck of certain largest and smallest expected diameters; said gasket comprising a generally cylindrical resilient member, an upper section on said member with an inner annular ridge for sealing with the upper bowl and an outer inverted conical face conforming with the flare of the lower bowl neck, a central section on said cylindrical member in the form of a flexible web, tapered in thickness from a thin wall near said upper section to a thicker wall near the bottom of said web, the upper outside diameter of said web being slightly larger than the smallest expected neck diameter of the lower bowl, the bottom outside diameter of said web being slightly smaller than the smallest expected neck diameter, and an intermediate outside diameter of said web being slightly larger than the largest expected neck diameter, and a lower section on said cylindrical member with an inner annular stiffening ridge and a tapered outer face, said ridge being of greater internal diameter than the tubular stem on the upper bowl.

4. As an article of manufacture, a gasket for a coffee maker of the type having an upper bowl with a depending tubular stem and a lower bowl with a wide neck of certain largest and smallest expected diameters; said gasket comprising a generally cylindrical resilient member, an upper section on said member with an inner annular ridge for sealing with the upper bowl, a central section on said cylindrical member in the form of a flexible web tapered in thickness from a thin wall near said upper section to a thicker wall near the bottom of said web, the upper outside diameter of said web being slightly larger than the smallest expected neck diameter of the lower bowl, the bottom outside diameter of said web being slightly smaller than the smallest expected neck diameter, and an intermediate outside diameter of said web being slightly larger than the largest expected neck diameter, and a lower section on said cylindrical member with an inner annular stiffening ridge, said ridge being of greater internal diameter than the tubular stem on the upper bowl.

EARLE C. SULLIVAN.

REFERENCES CITED

The following references are of record in the file of this patent:

UNITED STATES PATENTS

| Number | Name | Date |
|---|---|---|
| 1,288,376 | Bleichrode | Dec. 17, 1918 |
| 2,015,983 | Wolcott | Oct. 1, 1935 |
| 2,086,357 | Farber | July 6, 1937 |
| 2,093,316 | Fowler | Sept. 14, 1937 |
| 2,381,104 | Burnham | Aug. 7, 1945 |
| 2,415,339 | Curtis | Feb. 4, 1947 |